United States Patent
Jeter et al.

(10) Patent No.: US 6,991,000 B2
(45) Date of Patent: Jan. 31, 2006

(54) MANIFOLD HAVING INTEGRATED PRESSURE RELIEF VALVE

(75) Inventors: David R. Jeter, Woodstock, GA (US); Robert J. Woodlief, Suwanee, GA (US)

(73) Assignee: Nordson Corporation, Westlake, OH (US)

( * ) Notice: Subject to any disclaimer, the term of this patent is extended or adjusted under 35 U.S.C. 154(b) by 269 days.

(21) Appl. No.: 10/441,331

(22) Filed: May 20, 2003

(65) Prior Publication Data

US 2004/0231732 A1    Nov. 25, 2004

(51) Int. Cl.
*F16K 31/122*    (2006.01)

(52) U.S. Cl. ................... 137/882; 137/454.2; 222/318; 251/63.6

(58) Field of Classification Search ............. 137/882 I, 137/561 R, 885, 115.16, 115.18, 115.26, 137/115.27, 494; 222/318 X; 251/30.01, 251/63.6 X
See application file for complete search history.

(56) References Cited

U.S. PATENT DOCUMENTS

| | | | | |
|---|---|---|---|---|
| 1,314,746 A | * | 9/1919 | Hayes | ................... 137/115.18 |
| 2,174,797 A | * | 10/1939 | Magnuson | ............. 137/115.18 |
| 2,262,031 A | * | 11/1941 | Meyer | .......................... 222/57 |
| 3,633,619 A | * | 1/1972 | Eckerlin | ...................... 137/885 |
| 3,636,969 A | * | 1/1972 | Jacobellis | ............... 137/115.26 |
| 5,715,864 A | | 2/1998 | Andel et al. | ................. 137/563 |
| 6,089,413 A | * | 7/2000 | Riney et al. | ................. 222/318 |
| 6,155,806 A | | 12/2000 | Andel | ......................... 417/523 |
| 6,433,315 B2 | | 8/2002 | Reifenberger et al. | ...... 219/421 |

* cited by examiner

*Primary Examiner*—Stephen M. Hepperle
(74) *Attorney, Agent, or Firm*—Wood, Herron & Evans, L.L.P.

(57) ABSTRACT

Apparatus for dispensing a liquid includes a manifold having a high pressure passageway adapted to be coupled to a source of the liquid and to deliver the liquid at an elevated pressure to a dispenser. The manifold further includes a low pressure passageway for exhausting pressurized liquid from the high pressure passageway. A pressure relief valve is coupled between the high pressure passageway and the low pressure passageway. The pressure relief valve has a valve member mounted for movement relative to a valve seat. One side of the valve seat defines a high pressure side in communication with the high pressure passageway and another side of the valve seat defines a low pressure side in communication with the low pressure passageway. A dynamic seal engages the valve member on the low pressure side and prevents leakage of the liquid from the low pressure side.

11 Claims, 3 Drawing Sheets

MANIFOLD HAVING INTEGRATED PRESSURE RELIEF VALVE

FIELD OF THE INVENTION

The present invention generally relates to apparatus and methods of relieving pressure in hydraulic systems, especially upon shutoff of such hydraulic systems. More specifically, the invention relates to pressure relief valves used in hot melt adhesive dispensing systems.

BACKGROUND OF THE INVENTION

Various types of pressurized hydraulic systems are used for dispensing materials, such as hot melt adhesives. In the past, portions of the systems have remained pressurized after the system was turned off or deactivated, and pressure relief had to be accomplished by manually relieving the system. Pressure relief valves were incorporated into the systems, however, these typically operated only when hydraulic pressures reached critically high levels. To alleviate safety related or other types of concerns, and also to conform to safety requirements in various jurisdictions, specialized pressure relief devices have been developed over the past several years. For example, U.S. Pat. No. 5,715,864 (the '864 patent), which is assigned to the assignee of the present invention, relates to a pressure relief valve which is configured to open upon deactivation of the associated hot melt dispensing system. More specifically, when the system is deactivated, pneumatic pressure to the valve is simultaneously relieved and this opens a dump valve which returns pressurized hot melt adhesive to a storage tank. This relieves any remaining hydraulic pressure in the system.

While the pressure relief valve disclosed in the '864 patent operates well, various areas for improvement have been identified and are addressed by the present invention. For example, the pressure relief valve of the '864 patent includes a valve element sealed by a dynamic seal during its reciprocating movement. This dynamic seal operates in the high pressure side of the hydraulic system and, therefore, is subject to increased wear and reduced life. In addition, each embodiment of the pressure relief valve described in the '864 patent is attachable to a liquid distribution manifold, however, it would be desirable to have a more integrated pressure relief valve and manifold assembly which still allows the pressure relief valve to be easily removed and maintained and/or replaced as necessary. Finally, it would be desirable to provide a pressure relief valve in which the valve seat area is continuously flushed by the flow of liquid in the dispensing system.

SUMMARY OF THE INVENTION

The present invention generally relates to an apparatus for dispensing a liquid including a manifold and a pressure relief valve constructed in accordance with one or more aspects of the invention as further discussed below. The manifold includes a high pressure passageway adapted to be coupled to a source of the liquid and to deliver the liquid at an elevated pressure to at least one dispenser. The manifold further includes a low pressure passageway for exhausting pressurized liquid from the high pressure passageway. The pressure relief valve is coupled between the high pressure passageway and the low pressure passageway and includes a valve member mounted for movement relative to a valve seat. When the valve member is spaced from the valve seat, liquid may flow from the high pressure passageway to the low pressure passageway. A valve actuating mechanism is coupled to the valve member to facilitate movement of the valve member away from or against the valve seat. In accordance with one aspect of the invention, a dynamic seal engages the valve member on the low pressure side of the valve seat to prevent leakage of the liquid from the low pressure side to the valve actuating mechanism.

The valve actuating mechanism preferably comprises an air operated piston coupled to the valve member and positioned in a piston chamber. The piston chamber communicates with a pressurized air inlet on one side of the piston and with a vent on an opposite side of the piston, and the opposite side of the piston further includes a spring for biasing the piston and the valve member toward an open position when pressurized air through the pressurized air inlet is removed. In the preferred embodiment, the pressurized air is supplied through a suitable valve, such as a solenoid valve, which automatically actuates when the dispensing system is deactivated or turned off such that the air pressure is relieved and the pressure relief valve automatically opens.

In other aspects of the invention, the pressure relief valve is preferably mounted within the manifold in a removable fashion. The valve seat is positioned at one end of the pressure relief valve and the valve actuating mechanism positioned at an opposite end of the pressure relief valve. To facilitate constant flushing of the valve seat, the valve seat is positioned, for example, at an innermost end of the pressure relief valve within the manifold and in communication with the high pressure passageway. The valve actuating mechanism is preferably positioned outside of the manifold and outside of a storage tank of the liquid which is coupled for fluid communication with the manifold.

Various additional details, objectives and advantages of the invention will become more readily apparent to those of ordinary skill in the art upon review of the following detailed description of the preferred embodiment taken in conjunction with the accompanying drawings.

DETAILED DESCRIPTION

Figure 1:
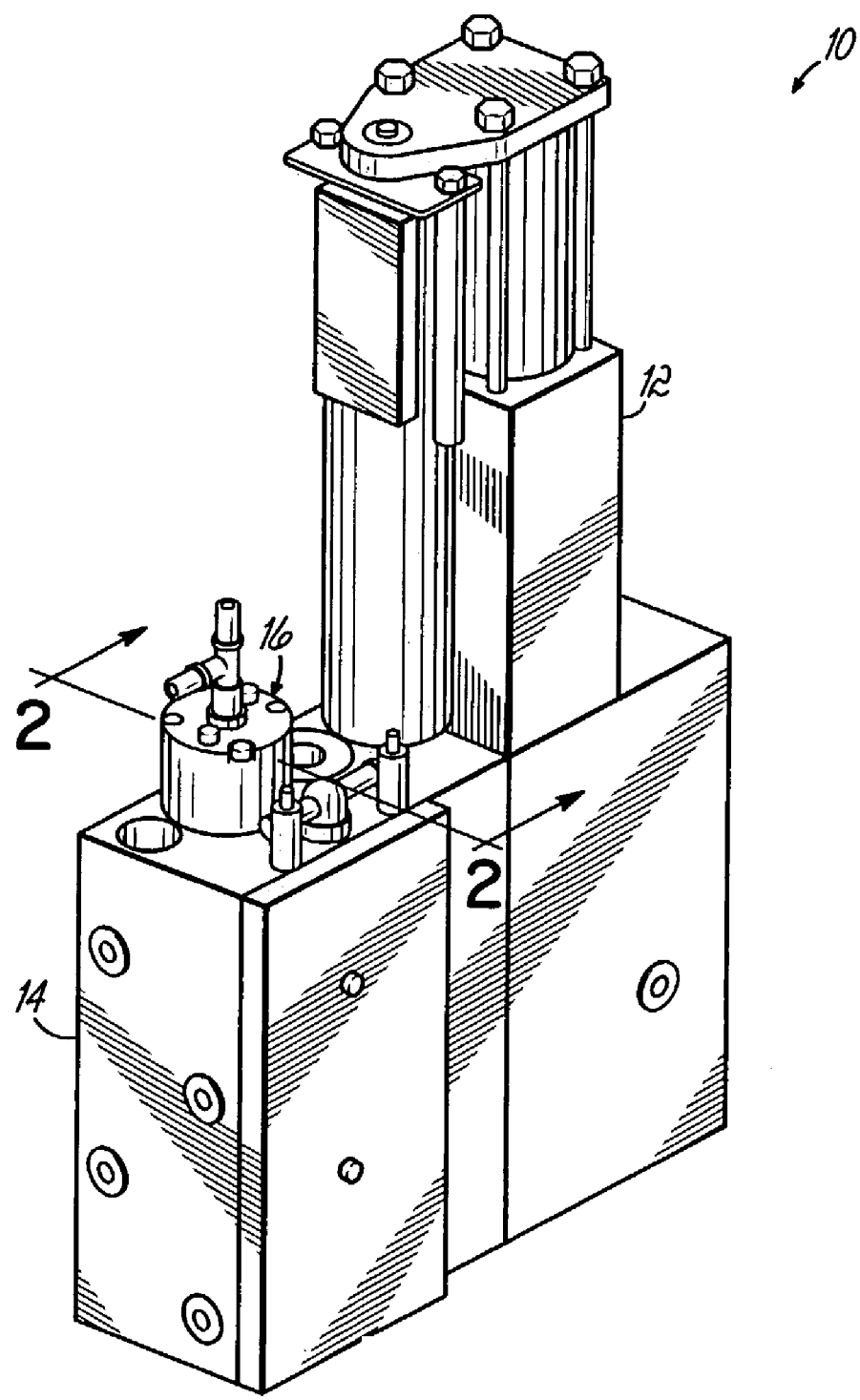
FIG. 1 is a perspective view of a pump and manifold assembly including a pressure relief valve constructed in accordance with the preferred embodiment of this invention.

FIG. 1 illustrates an apparatus 10 for dispensing a liquid including a pump 12 and a manifold 14 having a pressure relief valve 16 constructed in accordance with the invention. Apparatus 10 may, for example, be part of a dispensing unit, such as an adhesive melter, as disclosed in U.S. application Ser. No. 10/278,394 filed on Oct. 23, 2002, the disclosure of which is hereby incorporated by reference herein.

Figures 2, 2A:
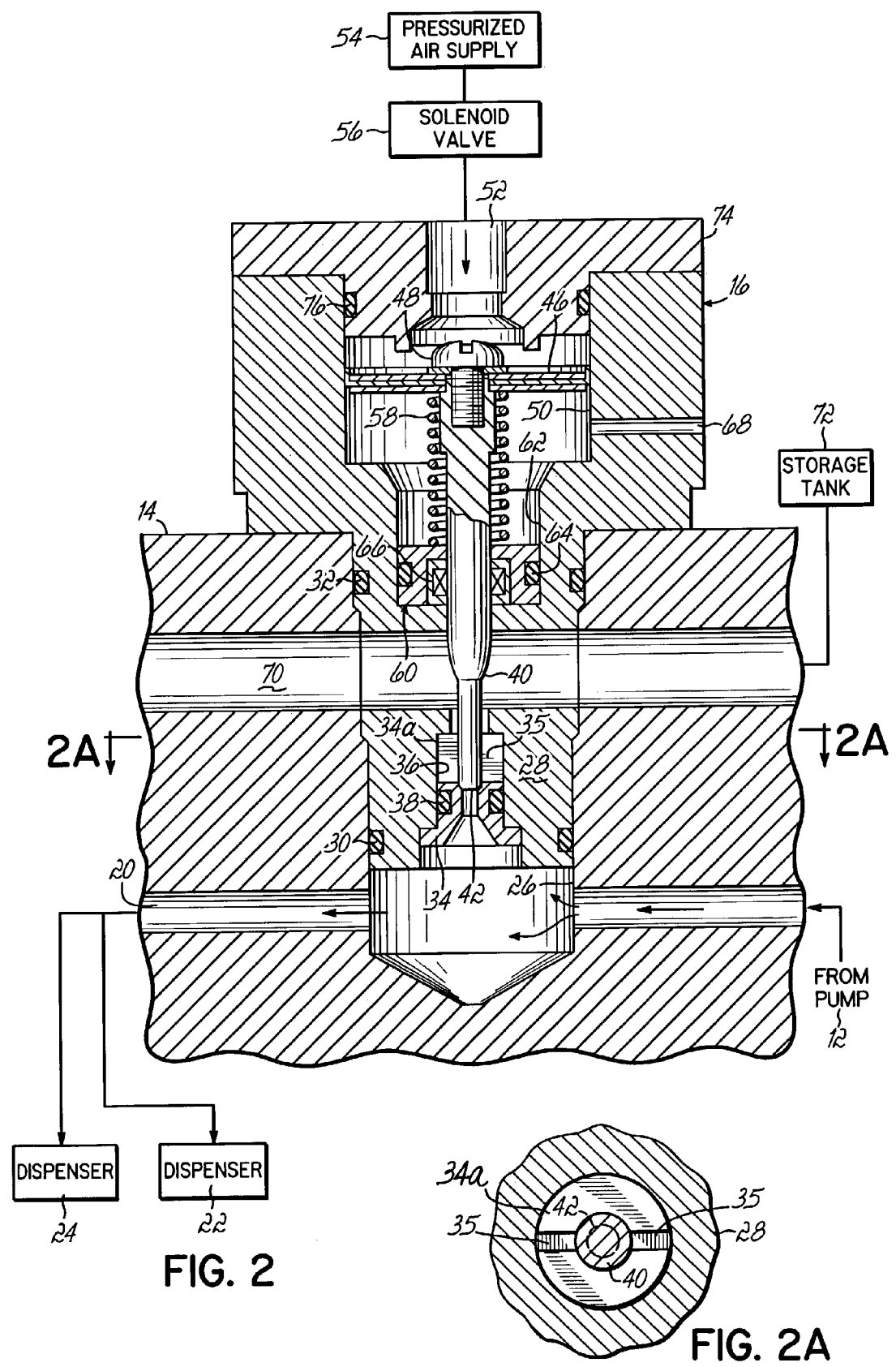
FIG. 2 is a cross sectional view of the pressure relief valve and a portion of the manifold taken along line 2—2 of FIG. 1, and showing the pressure relief valve in a closed position.
FIG. 2A is a cross sectional view taken along line 2A—2A of FIG. 2.
Figure 3:
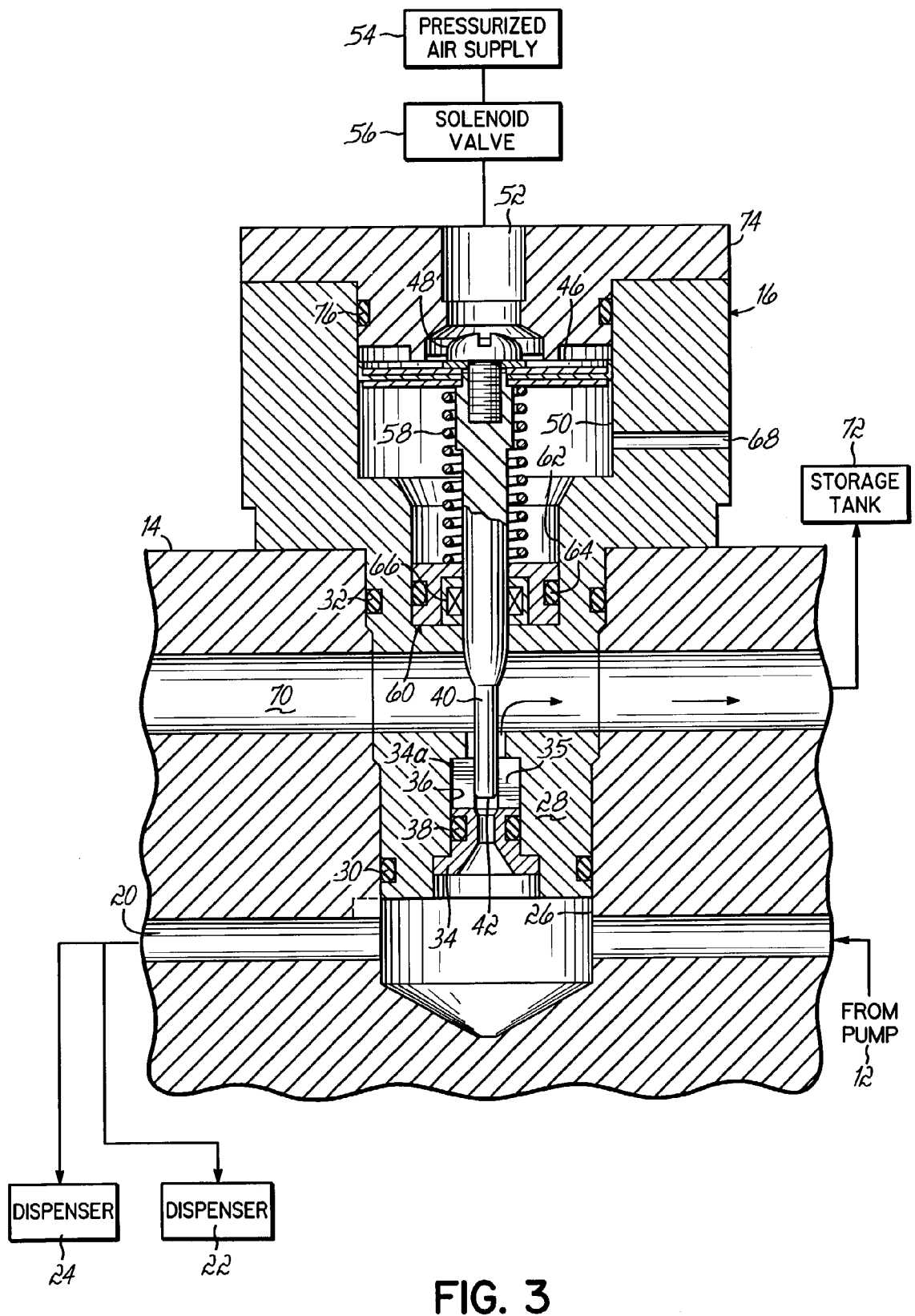
FIG. 3 is a cross sectional view similar to FIG. 2, but illustrating the pressure relief valve in an open position.

FIGS. 2 and 3 illustrate pressure relief valve 16 in cross section and respectively show closed and opened positions thereof. Specifically, manifold 14 includes a high pressure passageway 20 for distributing liquid from pump 12 (FIG. 1) to one or more dispensers 22, 24. High pressure passageway 20 communicates with a blind hole 26 which receives a portion 28 of pressure relief valve 16. A pair of O-ring seals or other types of suitable gasket 30, 32 provide static seals within blind hole 26 to prevent leakage of liquid material from manifold 14. Pressure relief valve 16 includes a valve seat 34 which is fixed within a stepped bore 36 and sealed against stepped bore 36 by an O-ring seal 38 or another type of suitable gasket. An upper guide member 34a assists in guiding valve stem 40 while also allowing flow through bore 35 (best shown in FIG. 2A) when valve seat 34 is in the open position (FIG. 3). Valve 16 further includes a reciprocating valve stem 40 having one end 42 engageable with and disengageable from valve seat 34 and having a piston 46 fastened to an opposite end by a threaded fastener 48. Piston 46 reciprocates within a piston chamber 50 with the outer circumference of the piston 46 making sealing contact with the chamber wall.

Valve 16 includes an air inlet 52 which receives pressurized air from a supply 54 upon actuation of a solenoid valve 56. Thus, when solenoid valve 56 is opened, pressurized air flows through inlet 52 and against piston 46 to maintain valve stem 40 in a closed position against valve seat 34. When the pressurized air is removed by closing solenoid valve 56, for example, a spring 58 causes an opposite movement of piston 46 and opens valve stem 40 as will be discussed further below. A seal assembly 60 is disposed within a lower portion 62 of piston chamber 50 and includes an outer static seal 64 and an inner dynamic seal 66. Dynamic seal 66 provides a seal against the movable valve stem 40. Piston chamber 50 further includes a vent 68 to vent air during movement of piston 46. Manifold 14 includes a low pressure passageway 70 which can be coupled in fluid communication with a storage tank 72, such as the melter tank of a hot melt adhesive melter (not shown). Pressure relief valve 16 further includes a cap 74 sealed to piston chamber 50 by, for example, an O-ring seal 76.

As mentioned above, when pressurized air is introduced into piston chamber 50 above piston 46 by opening solenoid valve 56, valve stem 40 is urged downwardly against valve seat 34 to prevent fluid flow from high pressure passageway 20 through valve seat and into low pressure passageway 70 as shown in FIG. 2. As shown in FIG. 3, when solenoid valve 56 is closed and pressurized air is therefore removed from the upper portion of piston chamber 50, piston 46 will move upwardly under the force of spring 58 until it is stopped by cap 74. In this position, valve stem 40 is disengaged from valve seat 34 and any high pressure liquid in passageway 20 can flow through valve seat 34 into low pressure passageway 70 and storage tank 72. As another useful feature, solenoid valve 56 may be a normally closed valve which only opens when it receives power, such as the system power of the associated adhesive melter unit. Thus, if the solenoid valve 56 is connected to system power, and system power is shut off, then solenoid valve 56 will move to its closed position thereby removing air pressure from above piston 46 and causing valve stem 40 to open under the force of spring 58. In this manner, when the system, such as the melter unit, is shut off, the hydraulic pressure in the system is automatically relieved by the disengagement of valve stem 40 from valve seat 34.

Various advantages are achieved by a pressure relief valve constructed in accordance with the invention. The dynamic seal 66, which is a component subject to wear, is located in the low pressure portion of the system, as opposed to the high pressure portion of the system. Thus, this seal 66 will be subject to reduced wear. In addition, valve seat 34 is directly exposed to high pressure liquid flow within bore 26 and, therefore, undergoes constant flushing to significantly reduce or prevent the accumulation of material such as char at this location. Finally, pressure relief valve 16 is easily affixed to manifold 14 in a replaceable manner and as an integral unit. As necessary, pressure relief valve 16 may be easily disconnected from manifold 14 and repaired or replaced as necessary.

While the present invention has been illustrated by a description of a preferred embodiment and while this embodiment has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims.

What is claimed is:

1. Apparatus for dispensing a liquid comprising:
   a manifold having a high pressure passageway adapted to be coupled to a high pressure source of the liquid and to deliver the liquid at an elevated pressure to a dispenser, said manifold further having a low pressure passageway for exhausting pressurized liquid from said high pressure passageway and a blind bore extending between said high pressure passageway and said low pressure passageway,
   a pressure relief valve received in said blind bore so as to be removably coupled between said high pressure passageway and said low pressure passageway, said pressure relief valve including
   a valve stem and a valve seat, said valve stem mounted for movement relative to and for contact with said valve seat to selectively allow liquid flow from said high pressure passageway to said low pressure passageway, one side of said valve seat defining a high pressure side in communication with said high pressure passageway so as to be constantly flushed by the liquid flowing through said high pressure passageway between the high pressure source of the liquid and the dispenser, and another side of said valve seat defining a low pressure side in communication with said low pressure passageway,
   a valve actuating mechanism coupled to said valve stem, and
   a dynamic seal engaging said valve stem on said low pressure side and preventing leakage of the liquid from said low pressure side to said valve actuating mechanism.

2. The apparatus of claim 1, wherein said valve actuating mechanism comprises an air-operated piston coupled to said valve stem and positioned in a piston chamber, said piston chamber communicating with a pressurized air inlet on one side of said piston and with a vent on an opposite side of said piston, said opposite side of said piston further including a spring for biasing said piston and said valve stem toward an open position when pressurized air through said pressurized air inlet is removed.

3. The apparatus of claim 1, wherein said pressure relief valve is removably inserted into said manifold.

4. The apparatus of claim 3, wherein said valve seat is positioned at an innermost end of said pressure relief valve within said manifold and said valve actuating mechanism is positioned at an opposite end of said pressure relief valve.

5. The apparatus of claim 4, further comprising a storage tank for holding the liquid, wherein said valve actuating mechanism is positioned outside said manifold and outside said storage tank.

6. The apparatus of claim 1, wherein said dynamic seal is positioned between said valve actuating mechanism and said low pressure passageway.

7. Apparatus for dispensing a liquid comprising:
a manifold having a high pressure passageway adapted to be coupled to a source of the liquid and to deliver the liquid at an elevated pressure to a dispenser, said manifold further having a low pressure passageway for exhausting pressurized liquid from said high pressure passageway, and a blind bore extending between said high pressure passageway and said low pressure passageway,
a pressure relief valve removably mounted within said blind bore of said manifold and including a valve member mounted for movement relative to a valve seat to selectively allow liquid flow from said high pressure passageway to said low pressure passageway, one side of said valve seat defining a high pressure side positioned to be in direct contact with liquid flowing through said high pressure passageway and another side of said valve seat defining a low pressure side in communication with said low pressure passageway, and said pressure relief valve further including an air-operated piston coupled to said valve member and positioned in a piston chamber, said piston chamber communicating with a pressurized air inlet on one side of said piston and with a vent on an opposite side of said piston, said opposite side of said piston further including a spring for biasing said piston and said valve member toward an open position when pressurized air through said pressurized air inlet is removed.

8. The apparatus of claim 7, wherein said pressure relief valve is removably inserted into said manifold.

9. The apparatus of claim 8, wherein said valve seat is positioned at an innermost end of said pressure relief valve within said manifold.

10. The apparatus of claim 9, further comprising a storage tank for holding the liquid, wherein said valve actuating mechanism is positioned outside said manifold and outside said storage tank.

11. The apparatus of claim 7, further comprising:
a dynamic seal engaging said valve member on a side of said valve seat opposite to said high pressure passageway.

* * * * *

UNITED STATES PATENT AND TRADEMARK OFFICE
CERTIFICATE OF CORRECTION

PATENT NO.     : 6,991,000 B2
DATED          : January 31, 2006
INVENTOR(S)    : David R. Jeter et al.

It is certified that error appears in the above-identified patent and that said Letters Patent is hereby corrected as shown below:

<u>Column 4,</u>
Lines 21-52, rewrite claim 1 as follows:
1.   Apparatus for dispensing a liquid comprising:

a manifold having a high pressure passageway adapted to be coupled to a high pressure source of the liquid and to deliver the liquid at an elevated pressure to a dispenser, said manifold further having a low pressure passageway for exhausting pressurized liquid from said high pressure passageway and a blind bore extending between said high pressure passageway and said low pressure passageway, a pressure relief valve received in said blind bore so as to be removably coupled between said high pressure passageway and said low pressure passageway, said pressure relief valve including a valve stem and a valve seat, said valve stem mounted for movement relative to and for contact with said valve seat to selectively allow liquid flow from said high pressure passageway to said low pressure passageway, one side of said valve seat defining a high pressure side in communication with said high pressure passageway so as to be constantly flushed by the liquid flowing through said high pressure passageway between the high pressure source of the liquid and the dispenser, and another side of said valve seat defining a low pressure side in communication with said low pressure passageway, a valve actuating mechanism coupled to said valve stem, and

UNITED STATES PATENT AND TRADEMARK OFFICE
CERTIFICATE OF CORRECTION

PATENT NO. : 6,991,000 B2
DATED : January 31, 2006
INVENTOR(S) : David R. Jeter et al.

It is certified that error appears in the above-identified patent and that said Letters Patent is hereby corrected as shown below:

Column 4 (cont'd),
     a dynamic seal engaging said valve stem on said low pressure side and preventing leakage of the liquid from said low pressure side to said valve actuating mechanism.

Signed and Sealed this

Thirteenth Day of June, 2006

JON W. DUDAS
*Director of the United States Patent and Trademark Office*